`US008348716B2`

(12) United States Patent
Ganz et al.

(10) Patent No.: US 8,348,716 B2
(45) Date of Patent: Jan. 8, 2013

(54) PET OF THE MONTH WITH MUSIC PLAYER

(75) Inventors: Howard Ganz, North York (CA); Karl Joseph Borst, Toronto (CA); Stephen Braund, Woodbridge (CA)

(73) Assignee: Ganz, Woodbridge, Ontario ( * ) Notice: Subject to any disclaimer, the term of this patent is extended or adjusted under 35 U.S.C. 154(b) by 84 days.

(21) Appl. No.: 12/953,921

(22) Filed: Nov. 24, 2010

(65) Prior Publication Data
US 2011/0126115 A1 May 26, 2011

Related U.S. Application Data

(63) Continuation-in-part of application No. 11/857,573, filed on Sep. 19, 2007, now Pat. No. 8,118,636.

(60) Provisional application No. 61/263,999, filed on Nov. 24, 2009.

(51) Int. Cl.
*G06F 3/00* (2006.01)
(52) U.S. Cl. .......................... 446/175; 463/39
(58) Field of Classification Search .................. 446/175; 463/39
See application file for complete search history.

(56) References Cited

U.S. PATENT DOCUMENTS

| | | | |
|---|---|---|---|
| 5,411,259 A | 5/1995 | Pearson | |
| 5,768,382 A | 6/1998 | Schneier et al. | |
| 6,200,216 B1 | 3/2001 | Peppel | |
| 6,251,017 B1* | 6/2001 | Leason et al. | 463/42 |
| 6,267,672 B1* | 7/2001 | Vance | 463/29 |
| 6,290,565 B1 | 9/2001 | Galyean, III et al. | |
| 6,468,155 B1 | 10/2002 | Zucker et al. | |
| 6,616,532 B2 | 9/2003 | Albrecht | |
| 6,663,105 B1 | 12/2003 | Sullivan et al. | |
| 6,692,360 B2 | 2/2004 | Kusuda et al. | |
| 6,758,746 B1 | 7/2004 | Hunter et al. | |
| 6,773,325 B1 | 8/2004 | Mawle et al. | |
| 6,910,186 B2 | 6/2005 | Kim | |
| 7,066,781 B2 | 6/2006 | Weston | |
| 7,081,033 B1 | 7/2006 | Mawle et al. | |
| 7,155,680 B2 | 12/2006 | Akazawa et al. | |
| 7,171,154 B2 | 1/2007 | Fujisawa | |
| 7,191,220 B2 | 3/2007 | Ohwa | |

(Continued)

FOREIGN PATENT DOCUMENTS
GB 2365364 A 2/2002
(Continued)

OTHER PUBLICATIONS

Grace, "Web Site Tycoon's Next Goal: Sixth Grade"; Woonsocket Call, Jun. 19, 2002.

(Continued)

*Primary Examiner* — Masud Ahmed
(74) *Attorney, Agent, or Firm* — Pearne & Gordon LLP

(57) ABSTRACT

A unique code is used to register a virtual pet or other item using a code that is associated with the pet, and which, when entered, allows viewing and interacting with a virtual representation of the actual item on the website. If the code is entered during a specific time period, it allows obtaining at least one additional item, for example an exclusive item that cannot be obtained in any other way. The specific time period can be extended, e.g., using supplemental codes. The codes may specify fixed or variable time periods, and may be generic extension codes and extend other things other than this period.

31 Claims, 3 Drawing Sheets

U.S. PATENT DOCUMENTS

| | | | |
|---|---|---|---|
| 7,249,139 B2 | 7/2007 | Chuah et al. | |
| 7,266,522 B2 | 9/2007 | Dutta et al. | |
| 7,297,063 B2 | 11/2007 | Fujisawa | |
| 7,314,407 B1 | 1/2008 | Pearson | |
| 7,396,281 B2 | 7/2008 | Mendelsohn et al. | |
| 7,425,169 B2 | 9/2008 | Ganz | |
| 7,442,108 B2 | 10/2008 | Ganz | |
| 7,465,212 B2 | 12/2008 | Ganz | |
| 7,478,047 B2 | 1/2009 | Loyall et al. | |
| 7,488,231 B2 | 2/2009 | Weston | |
| 7,534,157 B2 | 5/2009 | Ganz | |
| 7,548,242 B1 | 6/2009 | Hughes et al. | |
| 7,556,563 B2 | 7/2009 | Ellis et al. | |
| 7,568,964 B2 | 8/2009 | Ganz | |
| 7,604,525 B2 | 10/2009 | Ganz | |
| 7,618,303 B2 | 11/2009 | Ganz | |
| 7,677,948 B2 | 3/2010 | Ganz | |
| 7,789,726 B2 | 9/2010 | Ganz | |
| 7,846,004 B2 | 12/2010 | Ganz | |
| 7,862,428 B2 | 1/2011 | Borge | |
| 2001/0031603 A1 | 10/2001 | Gabai et al. | |
| 2001/0039206 A1 | 11/2001 | Peppel | |
| 2002/0107783 A1* | 8/2002 | La Mura et al. | 705/37 |
| 2002/0169668 A1 | 11/2002 | Bank et al. | |
| 2002/0198781 A1 | 12/2002 | Cobley | |
| 2003/0018523 A1 | 1/2003 | Rappaport | |
| 2004/0030595 A1 | 2/2004 | Park | |
| 2004/0043806 A1 | 3/2004 | Kirby | |
| 2004/0093266 A1 | 5/2004 | Dohring | |
| 2004/0242326 A1 | 12/2004 | Fujisawa | |
| 2004/0249712 A1 | 12/2004 | Brown et al. | |
| 2005/0059483 A1 | 3/2005 | Borge | |
| 2005/0071225 A1 | 3/2005 | Bortolin | |
| 2005/0137015 A1 | 6/2005 | Rogers et al. | |
| 2005/0177428 A1 | 8/2005 | Ganz | |
| 2005/0192864 A1 | 9/2005 | Ganz | |
| 2005/0250415 A1 | 11/2005 | Barthold | |
| 2005/0250416 A1 | 11/2005 | Barthold | |
| 2006/0079150 A1 | 4/2006 | Filoseta et al. | |
| 2006/0093142 A1 | 5/2006 | Schneier et al. | |
| 2006/0100018 A1 | 5/2006 | Ganz | |
| 2006/0129458 A1 | 6/2006 | Maggio | |
| 2007/0043620 A1* | 2/2007 | Leason et al. | 705/14 |
| 2007/0073582 A1 | 3/2007 | Jung et al. | |
| 2007/0082720 A1 | 4/2007 | Bradbury | |
| 2007/0088656 A1 | 4/2007 | Jung et al. | |
| 2007/0121843 A1 | 5/2007 | Atazky | |
| 2007/0130001 A1 | 6/2007 | Jung et al. | |
| 2007/0149285 A1 | 6/2007 | Osnato et al. | |
| 2008/0009350 A1 | 1/2008 | Ganz | |
| 2008/0009351 A1 | 1/2008 | Ganz | |
| 2008/0109313 A1 | 5/2008 | Ganz | |
| 2008/0134099 A1 | 6/2008 | Ganz | |
| 2008/0163055 A1 | 7/2008 | Ganz | |
| 2008/0163379 A1 | 7/2008 | Robinson et al. | |
| 2008/0221998 A1 | 9/2008 | Mendelsohn et al. | |
| 2008/0261687 A1 | 10/2008 | Gatzios | |
| 2009/0029768 A1 | 1/2009 | Ganz | |
| 2009/0029772 A1 | 1/2009 | Ganz | |
| 2009/0053970 A1 | 2/2009 | Borge | |
| 2009/0054155 A1 | 2/2009 | Borge | |
| 2009/0063271 A1 | 3/2009 | Ganz | |
| 2009/0063282 A1 | 3/2009 | Ganz | |
| 2009/0131164 A1 | 5/2009 | Ganz | |
| 2009/0204420 A1 | 8/2009 | Ganz | |
| 2010/0151940 A1 | 6/2010 | Borge | |
| 2011/0092128 A1 | 4/2011 | Ganz | |
| 2011/0276377 A1* | 11/2011 | Kim et al. | 705/14.17 |

FOREIGN PATENT DOCUMENTS

| | | | |
|---|---|---|---|
| JP | 2002063092 A | 2/2002 | |
| WO | 01/02072 A1 | 1/2001 | |
| WO | 01/69829 A2 | 9/2001 | |

OTHER PUBLICATIONS http://web.archive.org.web.20031202190119/www.monopets.com/, Dec. 2, 2003.

Search Report for Application No. PCT/CA2008/001424, filed Aug. 1, 2008.

Augmenting the Virtual Domain with Physical and Social Elements—Magerkurth (Jun. 3, 2004).

* cited by examiner

PET OF THE MONTH WITH MUSIC PLAYER

This application claims priority to provisional application No. 61/263,999, filed Nov. 24, 2009, the disclosure of which is hereby incorporated by reference. This is also a continuation in part of application Ser. No. 11/857,573, filed Sep. 19, 2007, the disclosure of which is also herewith incorporated by reference.

BACKGROUND

GANZ markets a product which includes both real-world items, and their virtual replicas. Webkinz® stuffed animals allow obtaining both a stuffed animal or other "pet", and a virtual representation of the pet on a website. Techniques of the website and user interaction are described in patent application publication number 2005-0177428, the subject matter of which is herewith incorporated by reference.

Briefly, a unique registration code is associated with the toy or other item, and that registration code opens content on the website when entered on the website. The content that is opened has an appearance that resembles the toy.

SUMMARY

Embodiments allow users with the ability to download and save an item, such as a music file, a video file, and/or any other kind of multimedia file, that is unlocked upon entering a unique code corresponding to a virtual product and associating the virtual product with a user account, e.g., by "adopting". The virtual product may be a virtual version of real product that is associated with the unique code. The item can be an extra item provided to the user only upon a registration system determining that the registration of a particular product or type of product occurred during a specified and limited time period. The item can also include an item, such as an audio file, a video file, or a music video file, that includes a virtual replica of the real product.

Embodiments describe the use of a first code on a website to produce a real-world image of an item associated with the code. That image of the real-world item is displayed on the website. According to an embodiment, that image may be part of a virtual reality representation that virtually shows the real-world item and allows interaction with the real-world item.

According to the present application, special features are obtained on the website associated with at least one additional operation carried out during registration of the first code.

An aspect describes that special features are obtained only when the first code is registered during a specified and limited period of time.

Another aspect describes another code that can be used to extend the period of time in various ways.

Another aspect describes that a special code can be used in place of the registration during the limited period of time.

DETAILED DESCRIPTION

An embodiment describes a pet of the month operation which allows special rewards for registration during a limited time. While the embodiment describes pets, it should be understood that items can be any item of any type that is capable of being made in a real-world item, and also displayed "virtually," that is by images or animations on a website. For example, other embodiments may include, in place of pets, dolls, or other items. As used herein, the terms "virtual replica," "virtual representation," and the like, refer to an image that resembles or is otherwise indicative of a real-world item or product, but is not necessarily identical in appearance to the item or product.

A code is included with the real-word item, such as by being printed on a tag or stored in a memory device attached to the real-world item, or providing the code in some other way. The code may be a unique registration code. During an adoption process, the unique registration code is entered, causing an image, such as an image indicative of and resembling the real-world item or other virtual representation of the real-world item with which the registration code is associated, to be displayed on the website.

Different types of pets are available for adoption, for example black cats, golden retriever dogs, horses, pigs, etc. Each month, one type of the pets that is available for adoption becomes spotlighted. That type of item becomes the pet of the month for that one month (or other limited) period.

According to another embodiment, there may be more than one pet of the month, for example between 1 and 5 pets of the month. Adopting that type of pet during the spotlighted period entitles the adopter to a special online gift or extra item. Different extra items can be provided for adopting a pet during the spotlighted period, for example bonus virtual cash that is available on the website, or a virtual item on the website for the type of pet that may be an exclusive item, available only to people who have adopted that type of pet during the spotlighted period.

Figure 1:
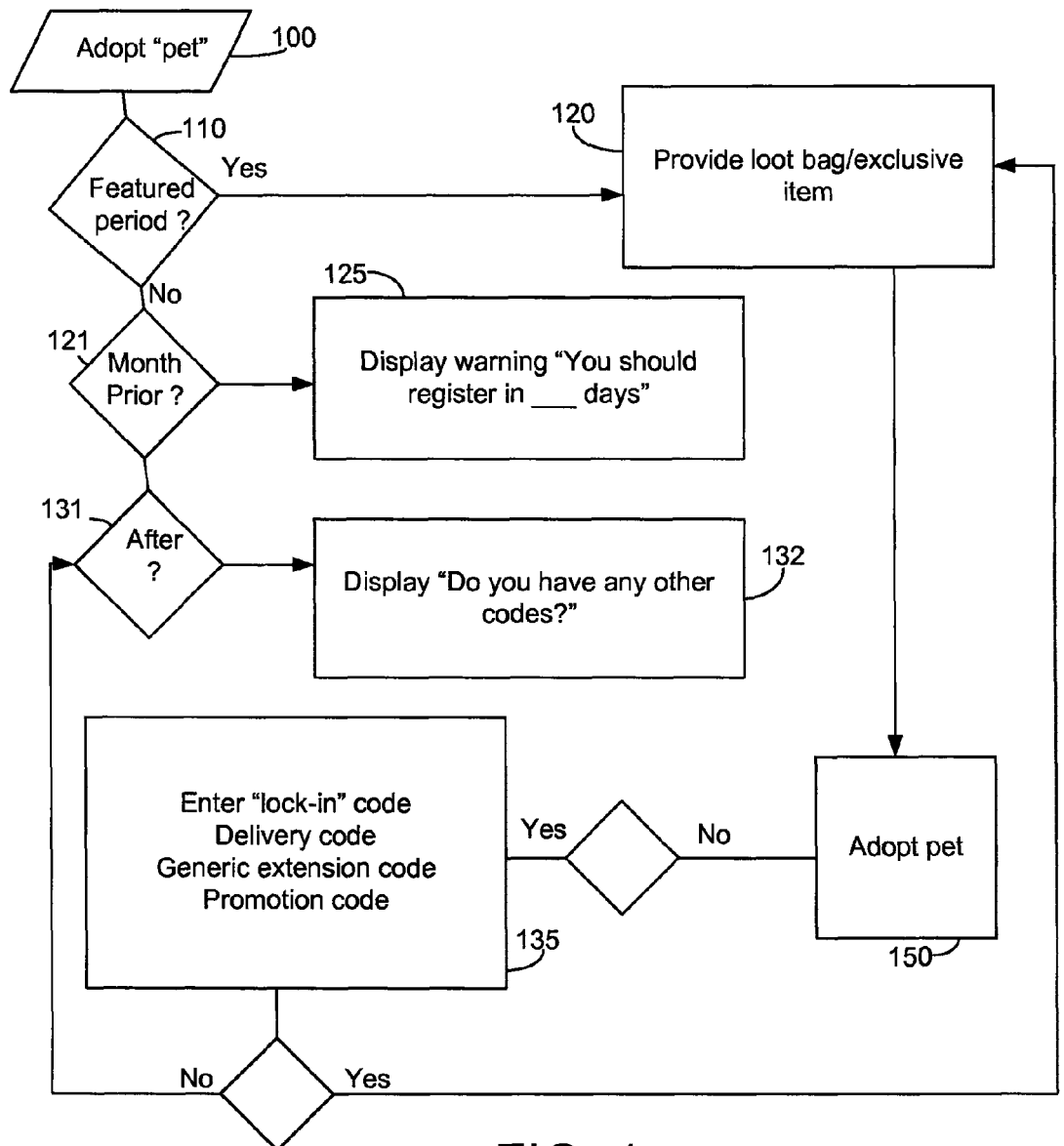
FIGS. 1 and 2 illustrate flowcharts of operation of the present embodiments, as executed on a computer.

FIG. 1 illustrates a flowchart that can be carried out over a computer network such as the Internet. At 100, a user enters the registration code provided with a pet, to "adopt" the pet. 110 tests to determine if the current time is during a period during which the type of pet to which that adopted pet belongs is spotlighted as being the pet of the month. 110 refers to this as the feature period, e.g. a calendar month. If the adoption occurs during the feature period, an extra item, such as an exclusive item for the pet, is provided in addition to the adoption at 120. An embodiment may provide an extra item that is a "loot bag" that includes bonus virtual cash, exclusive items, and/or other items. For example, the exclusive items may be vehicles, animated ponds, and other virtual items that can interact with the adopted pet, existing pets, or others.

The embodiment may announce the next month's pet, some time before the beginning of the following month, for example 10 days ahead or one month ahead. The only thing that matters in order to obtain the extra item is that the adopted pet is of the specified type and is adopted and registered at 100 during the featured month. Accordingly, users can obtain the extra item by purchasing the pet ahead of time, and waiting to register the pet at 100 until the featured month begins.

Retailers can also plan in the same way. This allows the retailers to order the pets ahead of time, in preparation for the month.

A number of aspects may be used to address the issues that may occur that are caused by a limited time offer.

For example, during a period prior to the pet of the month featured period, such as the month before, a warning system may be initiated. 121 detects the user attempting to adopt a pet which is a future pet of the month at a time before the pet of the month is active. A warning may be displayed at 125 indicating that this is a future pet of the month, and indicating when the pet should be registered, for example in 5 days or some other number. This thus reminds the new owner to wait until the proper time, so that they get the extra item. However, if the new owner does not want to wait, the pet can still be registered without the extra time.

Another problem may occur due to the realities of sale. For example, a retailer may be hesitant to buy too many pets, since they have a special value only during a specified time period. For example, if a pet is featured during the month of October, the retailers may buy only that number of pets that they are sure they can sell during the month of October. This may induce the retailers to buy a conservative number of the pets just to be sure that they don't have any left over at the end of October for example.

Another embodiment, therefore, provides an extension mechanism for the feature. 131 detects that the registration is occurring too late for the featured period. 132 then displays a query of whether the user has "any other codes". Additional feature codes, e.g. extension codes, can be used to allow obtaining the features at 120, even after expiration of the period.

One embodiment may provide a lock-in code at 135. For example, adopting the pet at 100 requires entry of a secret code associated with the pet. A second code may be provided to the retailer that is a lock in code that allows the pet to be adopted even after the feature period has elapsed. These second codes may be provided to the retailer, for example, on request of the retailer after the featured period has elapsed. The lock in codes may be specific to pet x, featured during month y. For example, if the retailer has 10 items left at the end of the featured period, they can request 10 lock-in codes for that item. The lock-in codes may be usable for a specified period of time, for example one month or three months. The lock-in code bypasses the expiration of the featured period and allows the user to obtain extra items for the pet at 120 as though it were during the feature period.

A delivery code may be provided when the items are bought through an e-commerce retailer. The concern would otherwise be that the time for delivery causes the user to receive the item after the feature period has ended. Items which are sent via e-commerce may have a delivery code included that extends the feature time (again for any specific pet) by an amount of time that is typical for a delivery. The delivery code can include for example, an extension for the specified time to allow delivery via a common carrier, for example two weeks.

Another embodiment uses generic extension codes. A generic extension code can be used for extending any limited time period for any item that will be registered on the website. For example, by entering a generic extension code, any expired operation on the website is automatically extended by the length of time specified by the extension code. In this way, retailers (or e-commerce purchasers) can be provided with some number of 30 day generic extension codes that they can give to any purchaser of any item. The retailers can include an extension code with any pet of the month that they sell later than that featured month. The extension codes allow the user to adopt the pet as though it were during the feature period, even after the feature period has elapsed. Unlike the lock-in codes, and delivery codes, the extension codes may be good for any pet.

A promotion code is an alternative code that can be given out to various users and/or sellers, and enable obtaining the reward at 120 independent of purchase of any pet, or of time. For example, in one embodiment, the promotion code may be given out to retailers, who are encouraged to give a promotion code with the purchase of three Webkinz® items. The promotion code is unlike the lock-in and delivery codes, since it provides the user with rewards independent of any item purchase. It is not an extension code, since it does not require any other code to extend. The promotion code allows the extra item at 120 to be obtained independent of adopting any pet/item, so long as the promotion code is entered.

The promotion code in general will not have a limited time during which it is usable (such as the period in 110). For housekeeping issues, however, the promotion code may have an expiration date to prevent someone attempting to use that code years in the future.

In general, any of the codes that are entered at 135 allow obtaining the extra item at 120. After all of these codes have been entered, the adoption is continued at 150 where the pet is adopted and added to the user's group of pets that can be used on the website. The items obtained at 120 are also added to the user's stored items.

For all of these embodiments described with reference to FIG. 1, the user enters a secret code which is used for registration of the pet/item and also to adopt the pet/item 150, obtain a virtual image of the pet, and allow interaction with the pet. The user also enters a feature code that gives the user other features, other than adoption of the pet/item. The embodiments disclosed above describe how the feature code can be specific to a specific pet, can have a limited time during which it can be used, or other.

During the period, e.g. a month, where a specified item becomes a featured item, e.g., where a pet becomes the Pet of the Month, other rewards may also be obtained. Any user who has such a pet registered on the site during the Pet of the Month period, even if that user did not register the pet in that month, may be afforded additional or exclusive activities. For example, users who have previously registered items that are now Pets of the Month, may be given additional activities, e.g., extra spins on a reward wheel (e.g., the Wheel of Wow™), or be eligible for drawings for rare items. The items that are given to those who have already registered the pets may be different than, or the same as, items given to those who register the pets during the time period.

Another embodiment relates to providing users with the ability to download and save an item, such as an audio file, a video file, and/or any other kind of multimedia file, that is unlocked upon entering a unique code corresponding to a virtual product and hence registering, referred to herein as virtually adopting the virtual product. The virtual product may be a virtual version of real product that is associated with the unique code. The adoption as described herein refers to any action that conforms or adds information about a virtual pet to a user's account or control.

The item can be an extra item provided to the user only upon a registration system determining that the registration of a particular product or type of product occurred during a specified and limited time period. The item can also include an item, such as an audio file, a video file, or a music video file, that includes a virtual replica of the real product.

The embodiments can also be implemented on any suitable website including a chat function, such as the one described in U.S. Patent Application Publication No. 2008/0163055 A1 to Ganz, which is incorporated by reference in its entirety herein. Further, the disclosed embodiments can be implemented using features described in U.S. Patent Application Publication No. 2005/0059483 A1 to Borge or No. 2009/0063271 A1 to Ganz, which is also incorporated by reference in its entirety herein.

According to another embodiment, a special section is added to the website where members can special music videos and other multimedia information about the pet of the month. This special section also includes special capabilities that are provided to the users. According to one embodiment, using the above embodiment, when users unlock a pet of the month adoption, they receive a music and/or video content as a free download. This provides an added purchase incentive for the pet of the month adoption.

As in the above embodiments, an embodiment may provide special rewards to a user who have the "pet of the month" associated with their account. Two different embodiments can be used according to the two different parts of the system. In a first embodiment, the users are allowed to manually determine if any of their registered pets are a current pet of the month or in some embodiments, whether these were a pet of the month during a specified previous time period, e.g. during the past two months. If any of the pets qualify for a pet of the month reward, then the user takes some action to request the pet of the month content, which is provided by the computer.

This requires manual interaction by the user, and also may cause problems with users who have large numbers of registered items. It can take very long to view those items because of the large XML/HTML file that would be loaded to view a large number of pets/items. In one embodiment, the system may load only some of the pets at once, for example the system may load only six or some other number of pets at a time.

In another embodiment, a script is called, such as PHP script, when the user launches the video or audio player. That script automatically determines if any of the current pets are the pet of the month either during the current time period, or during some time period preceding the current time period that is defined according to the system. If so, then the current content is automatically associated with the users account.

The premium content associated with pet of the month, e.g. video and MP3 files, can be stored in a static XML file used to feed the video player. This, however, may prevent the system from restricting access to these files, as may be necessary or desirable by the system for certain operations. For example, in one embodiment, all of the different clients may be served with files that include all of the playable content, and the system may unlock certain parts of that content. This may be more difficult to do, however, in a static file. An alternative option creates the XML files from PHP and feeds them to the video player e.g. a flash application. This may make it more difficult for a hacker to copy and download the songs.

Figure 2:
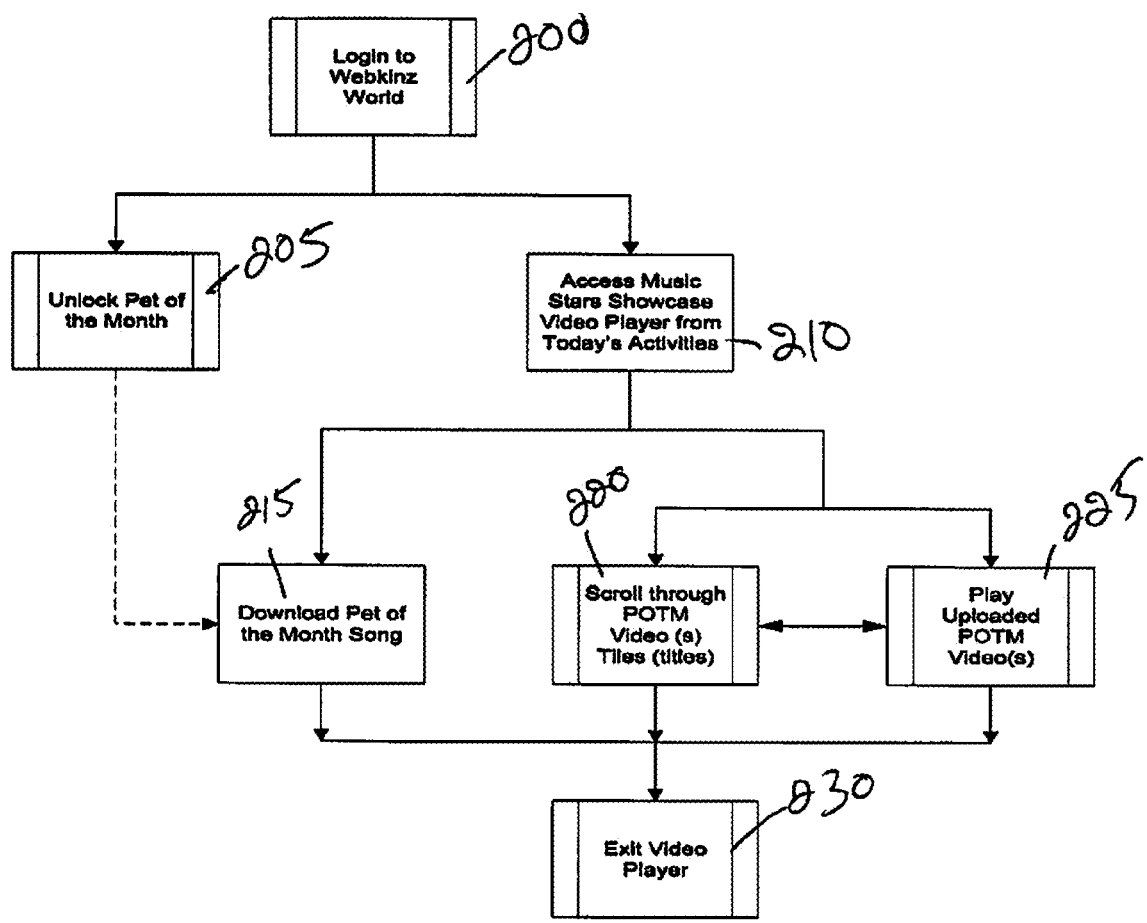

The process flow of the system is shown in FIG. 2. At 200, the user logs into Webkinz world, and may optionally at 205 unlock a pet of the month by entering a code associated with that pet of the month. Alternatively, or in parallel, the user at 210 accesses the video player from the "today's activities" screen. When accessing the video player, the user has a number of different options. The downloaded pet of the month video/music may be played at 215. The user can scroll through their different pet of the month videos titles at 220. At 225, the user is given an option to play their uploaded pet of the month videos. The user can stroll through and do things or exit at 230.

Figure 3A:
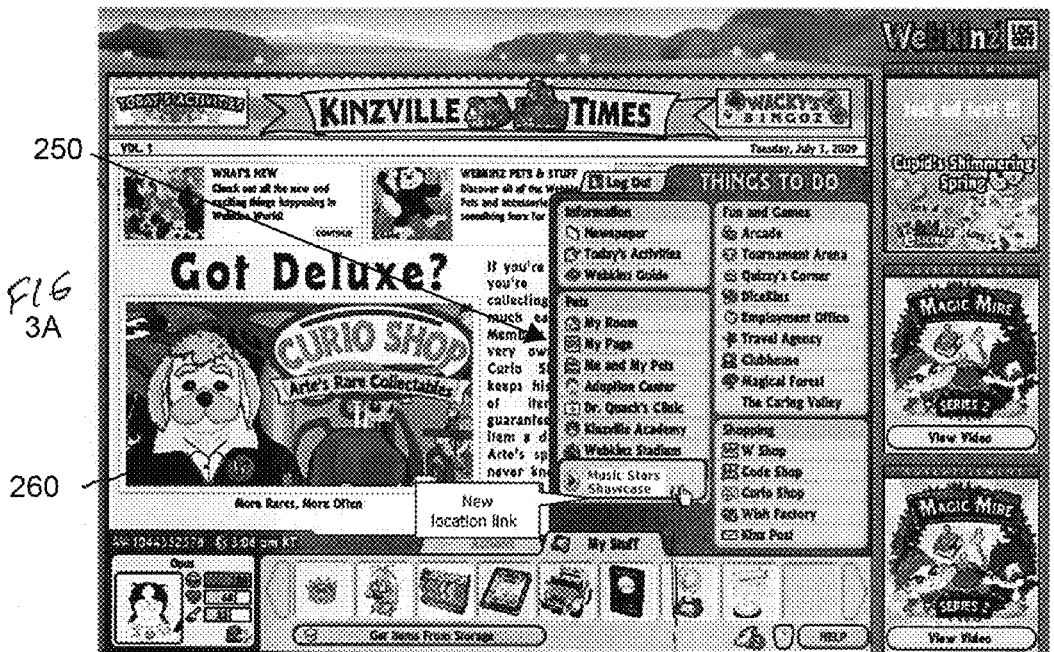
FIGS. 3A and 3B illustrate screen shots of a client computer displaying a website according to the present embodiments.

FIG. 3A illustrates a screen shot showing the current "things to do menu" 250, and showing the new music stars showcase 255 which can be added as part of this things to do menu 250. As explained in our co-pending applications, the things to do menu 250 may also include interfaces to a website shop such as 260, as well as other activities which can be currently carried out by a user of the website.

Figure 3B:
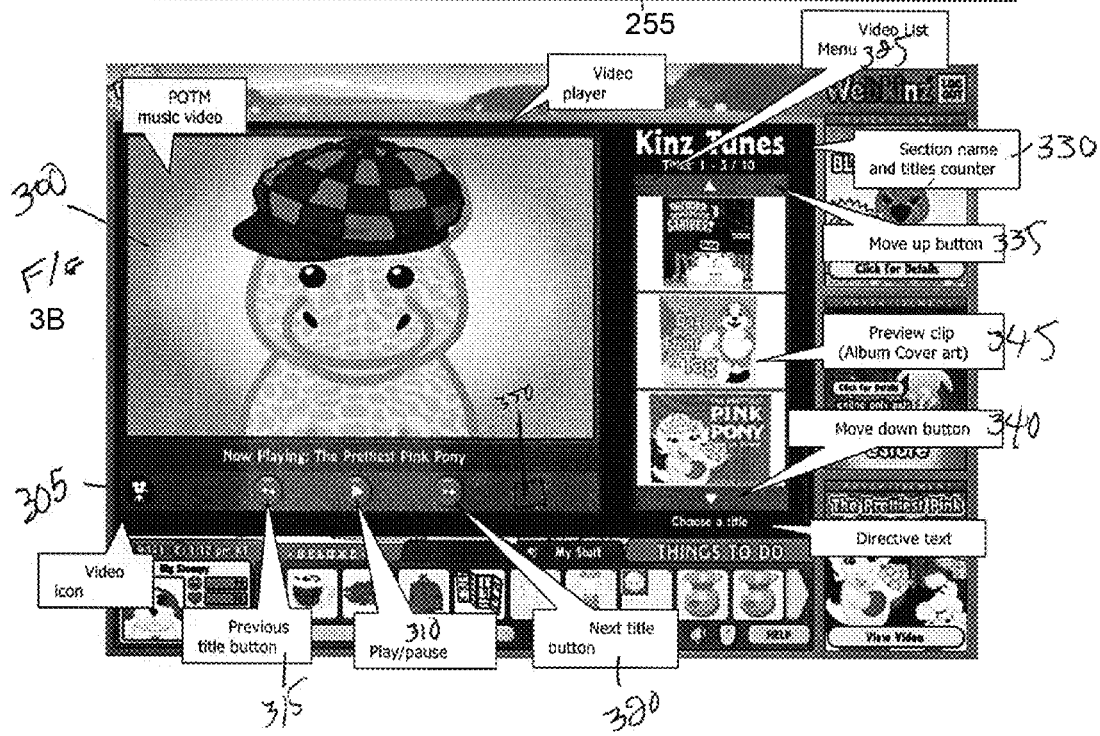

When the music stars showcase link is selected at 255, this brings up the pet of the month music video shown as 300 in FIG. 3B. This starts a video player, which shows the pet of the month as part of the video. In this embodiment, the player shows a video with the pet of the month, but in other embodiments, the player can show a music file such as an MP3 file, along with art such as album cover art.

The user can also use this player with the icons and controls that are provided. When the video is playing, the video icon 305 is displayed. This also allows the user to have access to the video buttons such as the play button 310 which can also be used as a pause button when pressed while the video/audio is playing. A previous title button 315 and next title button 320 can also be displayed. The user's selected or previously saved video lists can also be stored as 325, in a section that has the section names, here "Kinz Tunes" title counter telling the user how many titles they have stored at 330. The user can scroll through these titles using a move-up button 335 and a move down button 340.

For each title, the user previews the album cover art at 345, facilitating the decision of which of these items are to be selected.

The user can also save the currently playing video using the save button 350. Once pressing the save button, a conventional "save as" Windows user interface is invoked to enable the user to save the currently playing video or audio.

In one embodiment, different downloads may be shown to the user, but many of these downloads are shown as possible downloads that have not yet been unlocked. The user cannot actually download the items that have not yet been unlocked. The user can unlock a download by purchasing the pet of the month and adopting that pet.

This provides unlocking of at least one piece of media, and provides an unlock notification via a dialog that is triggered upon the closing of the pet of the month award dialogue. The user is thus enabled to download and save the media associated with their registered pet of the month.

Once the user has unlocked the media, they are provided with an active save button 350. This enables saving the media to the user's hard drive. The save as button for audio music file, for example, saves the file as an MP3 in the user's local hard drive for example in the "my music" folder of Windows.

The album cover art scene at 345 can be selected by a user e.g. by point and click, which then populates that graphic into the media player, placing the album, cover art such as 345 into the media player window 300. This will also start playing the media, e.g., an MP3.

In this embodiment, the user receives an additional function on the website, provided they have successfully unlocked the pet of the month club code during a proper time, and has an active account. The additional music stars showcase icon 205 is only displayed for those users who have unlocked a pet of the month and obtained media in this way. Users who have not successfully carried out these functions do not receive the pet of the month in this way.

The above has discussed operations that occur in both the server computer that for example hosts the website, and also in the client computer that connects to the website. However, it should be understood that the techniques described herein are intended to cover operations that occur in the server computer by itself, that allow a user to connect with the server computer according to the teachings given herein. These techniques also described the operation on the client computer by itself and are intended to cover operations that occur in the client computer by itself.

The general structure and techniques, and more specific embodiments which can be used to effect different ways of carrying out the more general goals are described herein.

Although only a few embodiments have been disclosed in detail above, other embodiments are possible and the inventors intend these to be encompassed within this specification.

The specification describes specific examples to accomplish a more general goal that may be accomplished in another way. This disclosure is intended to be exemplary, and the claims are intended to cover any modification or alternative which might be predictable to a person having ordinary skill in the art. For example, other items can be "adopted" and other kinds of extension codes and paradigms can be used.

It should be evident that this disclosure is by way of example and that various changes may be made by adding, modifying or eliminating details without departing from the fair scope of the teaching contained in this disclosure. The invention is therefore not limited to particular details of this disclosure.

In one or more exemplary embodiments, the functions described may be implemented in hardware, software, firmware, or any combination thereof If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, the inventors intend that only those claims which use the words "means for" are intended to be interpreted under 35 USC 112, sixth paragraph. Moreover, no limitations from the specification are intended to be read into any claims, unless those limitations are expressly included in the claims.

The operation of the flowchart is carried out by computers, which may be any kind of computer, either general purpose, or some specific purpose computer such as a workstation or dedicated server. The computer may be an Intel (e.g., Pentium or Core 2 duo) or AMD based computer, running Windows XP or Linux, or may be a Macintosh computer. The computer may also be a handheld computer, such as a PDA, cellphone, or laptop.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A method, comprising:
   accepting a registration code that is associated with a real-world item to allow registration of the real-world item on a website, where said real-world item cannot be registered on the website without said accepting said registration code;
   responsive to said registration of said real-world item on said website, providing at least one image on the website that is indicative of and resembling the real world item; determining if said registration has been accepted during a specified and limited time period; and if said registration was accepted during said specified and limited time period, providing both said at least one image and an item of media to a website user that carried out the registration, where said item of media is related to said real-world item, and if said registration was accepted outside said specified and limited time period, then providing said at least one image, but not providing said item of media to the website user that carried out the registration, and where said registration adds an item to a library of items associated with the website user.

2. A method as in claim 1, wherein said item of media is a video, and said video includes an image resembling said real-world item.

3. A method as in claim 1, wherein said item of media includes an audio song, and said audio song is associated with said real-world item.

4. A method as in claim 3, further comprising providing a part associated with said audio song, said part including an image resembling said real-world item.

5. A method as in claim 1, further comprising playing said media on the website using a virtual media player.

6. A method as in claim 5, wherein said website includes a link to media that was obtained by said registration during said specific and limited time period, wherein said link only provides media that was obtained during said specific and limited time period.

7. A method as in claim 6, further comprising on the website, determining if the user has obtained any media during said specific and limited time period, and providing a link to said media only if said user has created said media during said specific and limited time period.

8. A method as in claim 7, further comprising using a computer for determining if at least a first registered item in said library of items was registered prior to said specific and limited time period, and if so, then providing an item of media associated with said item to the website user during said specific and limited time period.

9. A method as in claim 1, further comprising an extension code, that when entered into the website allows the user to obtain said item of media during extended time period beyond said specific and limited time period.

10. A method as in claim 1, wherein said specific and limited time period is one specific calendar month.

11. A method as in claim 2, wherein said specific and limited time period is a specific period, and also including another period prior to said specific period during which said item of media can still be obtained even though said period has expired by taking an action on the website.

12. A computer system, comprising:
a website, accepting a unique registration code;
said website producing outputs indicative of viewing and interacting with a virtual item on the website, where said virtual item is provided after entering of the unique registration code; and
only if the unique registration code was entered during a specified time, said website producing outputs indicative of both said virtual item and an item of media on the website, where the item of media is related to the virtual item, and if the unique registration code is entered after said specified time, not providing said item of media on the website, and whenever the unique registration code is entered, adding an item to a library of items associated with a website user.

13. A computer system as in claim 12, wherein said item of media includes a video, and said video includes an image resembling a real-world item associated with the unique registration code.

14. A computer system as in claim 12, wherein said item of media is an audio song, and said audio song is associated with a real-world item associated with the unique registration code.

15. A computer system as in claim 14, further comprising a part associated with said audio song, said part including an image resembling a real-world item associated with the unique registration code.

16. A computer system as in claim 12, further comprising viewing said media on the website using a media player.

17. A computer system as in claim 16, wherein said website includes a link to media that was obtained by said registration during said specific and limited time period, wherein said link only provides media that was obtained during said specific and limited time period.

18. A computer system as in claim 17, further comprising on the website, determining if a user has obtained any media during said specific and limited time period, and providing a link to said media only if said user has created said media during said specific and limited time period.

19. A computer system as in claim 12, wherein said website determines if at least a first registered item in said library of items was registered prior to said specific and limited time period, and if so, then providing an item of media associated with said item to the website user during said specific and limited time period.

20. A computer system as in claim 12, further comprising an extension code, that when entered into the website allows a user to obtain said item of media during extended time period beyond said specific and limited time period.

21. A method, comprising:
registering a real world item on a website using a code;
providing a user with a virtual item, after said registering; and
only if said registering is carried out during a specified period during which said code represents an item that is associated with a special promotion time, providing both said virtual item and an item of media to the web site user that carried out the registration, where said item of media is related to said real-world item, and where the item of media is related to the virtual item and includes a likeness of the virtual item, and if the unique registration code is entered after said specified period, not obtaining said item of media on the website; and
where said registering adds an item to a library of items associated with the website user and further comprising using a computer for determining if at least a first registered item in said library of items was registered prior to said specific and limited time period, and if so, then providing an item of media associated with said item to the website user during said specific and limited time period.

22. A computer system, comprising:
a processor, running a program allowing entering a registration code that is associated with a real-world item to allow registration of the real-world item, communicating information indicative of said registration code to a network, of a type that allows viewing at least one image on a local computer, responsive to said entering of said registration code; and
receiving an item of media on the local computer that carried out the registration, but only if said registration was accepted during a specified and limited time period, and not if said registration is accepted at a time outside said specified and limited time period, where said item of media is related to said real-world item, and where said registration adds an item to a library of items associated with a website user, and
wherein said website determines if at least a first registered item in said library of items was registered prior to said specific and limited time period, and if so, then providing an item of media associated with said item to the website user during said specific and limited time period.

23. The computer system as in claim 22, wherein said item of media is a video, and said video includes an image resembling said real-world item.

24. The computer system as in claim 22, wherein said item of media includes an audio song, and said audio song is associated with said real-world item.

25. The computer system as in claim 24, further comprising providing a part associated with said audio song, said part including an image resembling said real-world item.

26. The computer system as in claim 22, further comprising playing said media on the local computer using a media player that is playing on the local computer.

27. The computer system as in claim 26, further comprising viewing a link to media that was obtained by said registration during said specific and limited time period, wherein said link only provides media that was obtained during said specific and limited time period.

28. The computer system as in claim 27, further comprising viewing a link to media only if a user has created said media during said specific and limited time period.

29. The computer system as in claim 22, wherein said at least one image is indicative of and resembles the real-world item.

30. The computer system as in claim 22, wherein said specific and limited time period is one specific calendar month.

31. The computer system as in claim 23, further comprising an extension code, that when entered into the website allows a user to obtain said item of media during extended time period beyond said specific and limited time period.

* * * * *